(12) United States Patent
Hudy

(10) Patent No.: US 6,594,668 B1
(45) Date of Patent: Jul. 15, 2003

(54) AUTO-NORMING PROCESS AND SYSTEM

(76) Inventor: John Joseph Hudy, 347 Melrose Ave., Mill Valley, CA (US) 94941

( * ) Notice: Subject to any disclaimer, the term of this patent is extended or adjusted under 35 U.S.C. 154(b) by 151 days.

(21) Appl. No.: 09/617,415

(22) Filed: Jul. 17, 2000

(51) Int. Cl.[7] .............................................. G06F 17/30
(52) U.S. Cl. ........................ 707/101; 707/10; 707/203; 705/4; 705/11
(58) Field of Search ............................... 707/1–10, 101, 707/100, 102; 705/4–11, 36; 714/38

(56) References Cited

U.S. PATENT DOCUMENTS 5,655,074 A * 8/1997 Rauscher ..................... 702/179
5,839,113 A * 11/1998 Federau et al. ................ 705/4
5,926,794 A * 7/1999 Fethe ........................... 705/11

* cited by examiner

Primary Examiner—Shahid Alam
(74) Attorney, Agent, or Firm—Risto A. Rinne, Jr.

(57) ABSTRACT

A system and process includes a computer that is preferably operatively connected to an area network, such as to the Internet. A database is maintained that is accessible to the computer. Raw data is provided to the computer that includes an assessment of a person's behavior or competency for a given area of interest. The raw data is a score or a rating. For example, on a scale from one to ten various people could rate how effective the person is at giving clear instructions. The raw data is the person's score in this area and it is stored by the computer as a file in the database for each person. Software in the computer is used to calculate a normed value for each person in a like-group having a file in the database. Calculation of the normed value requires mathematical comparison of the file for each person to be made with every other person in the group. The normed value is a statistically valid percentile that indicates how well any person fared for that particular competency when compared with all of the people in the group. It is provided to authorized personnel. The files are updated as new raw data is acquired and new normed percentiles are calculated when desired. The normed percentiles may be purged as desired or calculated for any time interval for any person in the group.

19 Claims, 5 Drawing Sheets

| PERSON | ITEM1 | ITEM2 | ITEM3 | ITEM4 | ITEM5 | ITEM6 | RAW AVG SCORE | RAW AVG SCORE SQUARED |
|---|---|---|---|---|---|---|---|---|
| JOE | 3 | 3 | 3 | 3 | 3 | 3 | 3 | 9 |
| FRED | 3 | 3 | 3 | | | | 3 | 9 |
| SAM | 1 | 2 | 3 | 1 | 2 | 3 | 2 | 4 |
| PAUL | 1 | 3 | 3 | 1 | 2 | | 2 | 4 |

FIG.3

| PERSON | Z-SCORE | R | W | W2 | P | PLEFT |
|---|---|---|---|---|---|---|
| JOE | 1.00 | | | | | |
| FRED | 1.00 | | | | | |
| SAM | −1.00 | 0.241971 | 0.811924 | 0.6592211 | 0.65568 | 0.841345 |
| PAUL | −1.00 | 0.241971 | 0.811924 | 0.6592211 | 0.65568 | 0.841345 |

FIG.4

| PERSON | Z-SCORE | AUTO-NORMED PERCENTILE |
|---|---|---|
| JOE | 1.00 | 50% |
| FRED | 1.00 | 50% |
| SAM | −1.00 | 16% |
| PAUL | −1.00 | 16% |

FIG.5

| 100—THINK | Z1 | R1 | W1 | W21 | P1 | PLEFT1 | PERCENT1 ←—120 |
|---|---|---|---|---|---|---|---|
| 108—FIRST PERSON 7.00 | -1.20 | .19 | .78 | .61 | .59 | .11 | 11.00 |
| 110—SECOND PERSON 14.00 | .28 | .38 | .94 | .88 | 1.01 | .61 | 61.00 |
| 112—THIRD PERSON 21.00 | 1.77 | .08 | .71 | .50 | .46 | .96 | 96.00 |
| 114—FOURTH PERSON 15.00 | .49 | .35 | .90 | .80 | .88 | .69 | 69.00 |
| 116—FIFTH PERSON 8.00 | -.99 | .24 | .81 | .66 | .66 | .16 | 16.00 |
| 118—SIXTH PERSON 11.00 | -.35 | .37 | .92 | .85 | .97 | .36 | 36.00 |

| 102—COMMUN | Z2 | R2 | W2 | W22 | P2 | PLEFT2 | PERCENT2 ←—122 |
|---|---|---|---|---|---|---|---|
| 108— 6.00 | -1.08 | .22 | .80 | .64 | .63 | .14 | 14.00 |
| 110— 12.00 | .41 | .37 | .91 | .83 | .93 | .66 | 66.00 |
| 112— 18.00 | 1.90 | .07 | .69 | .48 | .44 | .97 | 97.00 |
| 114— 11.00 | .17 | .39 | .96 | .93 | 1.10 | .57 | 57.00 |
| 116— 8.00 | -.58 | .34 | .88 | .78 | .83 | .28 | 28.00 |
| 118— 7.00 | -.83 | .28 | .84 | .70 | .72 | .20 | 20.00 |

| 104—LEAD | Z3 | R3 | W3 | W23 | P3 | PLEFT3 | PERCENT3 ←—124 |
|---|---|---|---|---|---|---|---|
| 108— 10.00 | -1.55 | .12 | .74 | .54 | .50 | .06 | 6.00 |
| 110— 20.00 | .08 | .40 | .98 | .96 | 1.18 | .53 | 53.00 |
| 112— 30.00 | 1.71 | .09 | .72 | .51 | .47 | .96 | 96.00 |
| 114— 17.00 | -.41 | .37 | .91 | .83 | .93 | .34 | 34.00 |
| 116— 17.00 | -.41 | .37 | .91 | .83 | .93 | .34 | 34.00 |
| 118— 23.00 | .57 | .34 | .88 | .78 | .84 | .72 | 72.00 |

| 106—PROJECT | Z4 | R4 | W4 | W24 | P4 | PLEFT4 | PERCENT4 ←—126 |
|---|---|---|---|---|---|---|---|
| 108— 2.00 | -1.12 | .21 | .79 | .63 | .62 | .13 | 13.00 |
| 110— 4.00 | .22 | .39 | .95 | .90 | 1.06 | .59 | 59.00 |
| 112— 6.00 | 1.57 | .12 | .73 | .54 | .50 | .94 | 94.00 |
| 114— 5.00 | .89 | .27 | .83 | .69 | .69 | .81 | 81.00 |
| 116— 3.00 | -.45 | .36 | .91 | .82 | .91 | .33 | 33.00 |
| 118— 2.00 | -1.12 | .21 | .79 | .63 | .62 | .13 | 13.00 |

FIG.6

AUTO-NORMING PROCESS AND SYSTEM

BACKGROUND OF THE INVENTION

Field of the Invention

The present invention, in general relates to processes that normalize data and, more particularly, to systems that include a data base and software to calculate a percentile (i.e. a norm) that indicates job performance level (i.e., competency) of a given person's file as compared with all other files in the data base.

There are countless situations that can benefit from the use of normalized data. By normalized data it is meant providing a percentile that indicates how a person, having data stored in a data base, compares with other people having data stored in the data base. This is discussed in greater detail hereinafter.

Usually, normalized data appertains to a measure of job performance or ability, often referred to as a competency. There is virtually no realm of human skills, preferences, and vocations that would not benefit from the availability of such data, as is also explained in greater detail hereinafter.

However, providing normalized data (i.e., norms) has been difficult to achieve heretobefore for a number of reasons. First, it is necessary to collect the data and to establish a file for each competency category that is being measured for each person for whom their performance is to be normed.

Second, it has been necessary to perform rather complex mathematical operations, including calculus, on the data to provide a norm. To avoid using calculus, an intermediate value, known as a "Z score", can be calculated.

The Z score is then used to refer to a lookup table (of Z scores) to determine the area under a curve which represents the actual normed data (i.e., percentile) for a given competency and therefore how that person's scores compare in relation to all of the other people.

These steps must be repetitively performed for each person. Usually, the people doing this are not fluent with the mathematics or the calculus that is involved and so they may tend to shun the process.

Also, as new data becomes available for any of the people in the data base (i.e., having a file), it is necessary to redo the entire process so as to determine their most current percentile. As is discussed in greater detail hereinafter, it may be advantageous to use only recent data or it may be appropriate to use long-accumulated data to determine the norm.

The norm is expressed as a percentile. That percentile is indicative of job performance (i.e., competency) for a given area that is being measured when compared with other members in the group (i.e., having a file in the database).

It simply has not been practical heretobefore to often calculate norms. Neither has it been practical to collect the data in an efficient manner.

The inability to collect the data efficiently is compounded by the fact that the people themselves whose competencies are being measured may be scattered geographically.

For example, a firm may wish to determine the performance of its sales representatives. The sales representatives may be dispersed throughout the country or for that matter throughout the world.

Various factors may be included in the file in order to determine competency, such as the number of contacts each representative makes per month and the number of closes, (i.e., sales that result from each of those contacts). Many other factors may also be collected and deemed as useful in the norming process.

If this information is sent to an authorized company representative, for example an expert in human resources, there will be a delay in its acquisition. Accordingly, decisions based on the results of that data will of necessity be delayed until the data has been both collected and normed. As mentioned above, the norming itself is a cumbersome, slow process.

It is desirable to collect this information in as close to real-time as is possible and to do so in as cost-effective a manner as possible.

As mentioned above, many firms do not have the expertise "in-house" to even properly utilize this data (i.e., an ability to calculate the normed percentiles), nor do they have the means such as the necessary data base and software, none of which has been available heretobefore for a number of reasons.

As the mathematics involved is complex, it takes time to perform the necessary operations. There has been no way heretobefore to collect the data or to conveniently process the collected data (also known as raw data) to obtain the normed values.

One significant reason contributing to a lack of solution is that such software algorithms would, of necessity, be slow as they performed the complex mathematical operations. Therefore, it is desirable to be able to provide a quicker approach that can be used to normalize data. It simply has not been feasible previously.

If it were desired to access this data and initiate a calculation of the norms remotely, such as over the Internet, the slow speed could make such a system intolerable.

Ideally, if this data could be captured by a secure system connected to either the Internet or to an Intranet (i.e., an in-house computer system having remote access capabilities), then a means would be provided to capture the data in, or near, real-time.

Ideally, if this system included software that overcame the problems of slow calculations (which is compounded by the number of data points to be normed and the modem transfer rate), then an optimum system would be provided.

It is also important to note that access to such a system would likely be available for use on a fee schedule. That fee schedule could be based on a measurement of time that the database and system is accessed or it could be based on some other fee structure, such as the size of the database, or on a monthly fee. Obviously, a faster processing time will be of benefit to all concerned and would provide a more cost-effective solution.

Accordingly, subscribers could access the data and request normalized data for any of the files. If this could be done easily and as often as desired, then important decisions could be made quickly and efficiently. This would save a company a great deal of money. This is discussed in greater detail hereinafter.

In the above example, if one of the sales-persons was performing at a very low rate, closing a totally unacceptable rate of contacts and if that person had other poor parameters, knowing about this as soon as possible would be of great benefit to the company in making a decision to remove that person from a position which he is not well suited for and that was likely alienating many potential customers.

A normed percentile makes his performance or lack thereof obvious to those in a position to decide. This level of confidence is not available by examination of the "raw scores", as is discussed in greater detail hereinafter.

Conversely, a person performing at a very high level should be soon rewarded lest he leave the firm for not being appropriately valued.

Some of the benefits the use of norms (i.e., normalized percentiles) can provide are as follows:

1. Norms provide a measure of competency based on the performance of any person relative to all of the members that are being compared.
2. Norms establish performance standards for the various groups (i.e., job classes).
3. Norms are useful in determining those members having exceptional ability in any group. This is useful to determine, among other things, which individuals are likely to become effective leaders or mentors.
4. Norms automate the evaluation and reporting of performance. This is a very difficult, time consuming, and subjective arena for most organizations.
5. Norms track and therefore help to determine the efficacy of programs that are designed to improve performance.
6. Norms provide valid, reliable data upon which human resource decisions are made. These include, among others, decisions that relate to hiring, firing, salary adjustments, bonuses, promotions, demotions, lateral changes in job assignments, etc.
7. Norms provide legally defensible data upon which these decisions are made. For example, a decision to terminate an employee can often subject an employer to liability arising from a claim of "wrongful termination". If the employer had a basis.of data upon which to justify that decision that was not subjective, then the decision by the employer to terminate would be defensible. Not only would this save the employer from false liability claims, but it would also allow the employer to more quickly weed out poorly performing employees.

Furthermore, when taken into account with item number "5" above, the normalized data would show how a poorly performing employee did not benefit from the opportunities to improve his performance that were afforded him. Not only that, but it would also demonstrate the efficacy of those improvement programs generally. This would only serve to strengthen the defensibility of any such decision to terminate (or to offer a transfer to a different location or assignment).

The only way to reliably measure, track, and improve performance on the job is by the use of numeric normative data. This is explained in greater detail hereinafter. For now it is important to consider some of the other advantages norming can provide.

Norms allow different competencies (with different numbers of "attributes" and "behaviors") to be compared to one another on a common scale. The use of raw data cannot produce reliable performance standards. It is subjective and open to interpretation. Norms remove the subjectivity and great degree of interpretation that is commonly done by those who do the ratings (i.e., the raters) making performance assessments.

It is useful to examine what norms are in somewhat greater detail before proceeding.

Any new assessment instrument has no predetermined standards of "passing" or "failing". For example, one may be looking for leadership qualities in an organization. This may be done so that the most appropriate people can be culled and trained for leadership positions. In order to do this an effective instrument to measure leadership must be provided.

This instrument begins in the form of a series of questions and the answers to those questions for any one particular person. This provides a rating. It is in the form of raw data and, initially, is of little use. Once it is converted to a norm, it is of great use.

For example, as the instrument is being created, communication skills are likely to be relevant to an assessment of leadership ability, whereas a favorite dessert item is far less likely to have relevance.

Consequently, performance standards must be determined and evaluated on the basis of empirical data and through the calculation of norms. Over time, the reliability of the performance standards is both proved and improved.

Norms compare an individual's score to the scores obtained by everyone else that is being rated.

Norms set a clear empirical'standard for what is considered to be performance that is below expectations, meets expectations, and that which exceeds expectations.

Raw scores on any assessment instrument are essentially meaningless. For example, to say that a person has a total raw score of 14 on the "critical thinking" competency assessment conveys little or no information about his or her standing in this area.

Is a raw score of 14 good or bad? Is that person's performance below, the same as, or above the performance of his or her peers? Should that person receive a large salary increase for exceptional performance or no increase and a warning for very poor performance? Clearly, a raw score is essentially a meaningless number. This is where subjective evaluation can enter. If the rater "likes" the person, then a raw score of 14 may be considered good. If the rater "dislikes" the person, then the same raw score may be subjectively used in support of an assessment of poor performance or competency.

In order to determine more precisely an individual's exact level of performance, the raw scores must be converted into a standardized score for any particular area of interest. That standardized score is a norm score that is expressed relative to the population mean and standard deviation of the competency that is in question.

Accordingly, norms indicate an individual's relative standing to the population, thus permitting an evaluation of his or her performance in reference to other people.

Norms also provide comparable measures that permit a direct comparison of the individual's performance across different competencies (for example, critical thinking, communication, etc.) and across different job classes (Job 1, Job 2, etc.). Without norms, these comparisons simply cannot be made.

Each competency raw score in a performance appraisal may include a different number of items and may be measuring a different set of behaviors and attributes. All raw competency scores are transformed to a standardized distribution with a mean of 0.0 and a standard deviation of 1.0. These standardized (or normed) values can thus all be expressed as cumulative percentages (from 0% to 100%) thereby allowing for an "apples to apples" comparison across each competency and within each job classification.

For example, assume that a person, "Associate 1" had a raw score of 16 on both "critical thinking" and "communication". Let's also assume the distribution of raw "critical thinking" scores had a mean of 15.0 and a standard deviation of 2.0, and that the distribution of raw "communication" scores had a mean of 15.0 (the same mean) but a standard deviation of 1.0. In this case, his normed critical thinking score would be 69% and his normed communication score would be 84%.

In other words, he would be in the 69th percentile of critical thinking, as compared with other associates, and he would be in the 84th percentile for communication. Accordingly, it would be known that he had moderately good critical thinking ability and very good communication ability when compared with his peers. By looking at the scores of other associates, an effective assessment of his competency is provided.

This also serves as a concrete example of how two identical raw scores for different areas of competency could, in reality, indicate drastically different levels of performance. Looking at the raw scores one would think that Associate 1 was equally as competent in his critical thinking abilities as he was in his communication abilities. The norms show us that this is simply not true. His performance must be mathematically compared with that of his peers in order to determine his true level of competency.

If any of the values (means, standard deviations) were to change, and they all will change over time as new performance data is obtained, then the outcome would again produce very different definitive assessments of competency. This, in turn, indicates the need for not only normalizing data, but of doing so in a continuous fashion.

It has clearly been shown the value of normalized data. It has also been shown the need to obtain this information quickly, and from a wide variety of locations geographically. An ability to collect raw data scores and store them in a data base and calculate the norms on demand would also provide the following benefits:

1. Performance standards would always be current. With an effective auto-norming capability, norms could be determined "on the fly" as new data is collected. As the new data is entered, those authorized to access that data (typically human resource personnel) would be able to determine performance as often as desired and in the competencies that are of interest.

2. Additionally, if desired, the database could be either purged of old data or considered in part so that the norms could be calculated based only upon the most recent data, thereby providing a mechanism to track improved (i.e., changing) competencies in both an accurate and a timely way.

There is great flexibility provided in this regard. For example, norms can be calculated on all the data collected to date, or by using data from specific evaluation periods. This allows for human resource personnel to make decisions to either maintain or to raise a "performance bar", as needed.

Over time, the net result will be to increase the performance of all of the members of the group (i.e., Job 1, Job 2, etc.). This will result in raising the performance "bar" for each job description as the competencies in that group generally improve.

Obviously, the organization that uses this approach will improve their ability to provide good service and excellent products to their customers. Therefore, the organization will benefit greatly from the use of norms as they evaluate the most important resource that they have, their employees.

Accordingly, there exists today a need for an auto-norming process & system.

2. Description of Prior Art

Norms are, in general, known. For example, the following patent describes one such types of a system:

U.S. Pat. No. 4,545,388 to John E. Roy, Oct. 8, 1985.

While the structural arrangements of the above described system, at first appearance, has similarities with the present invention, it differs in material respects. These differences, which will be described in more detail hereinafter, are essential for the effective use of the invention and which admit of the advantages that are not available with the prior system.

OBJECTS AND SUMMARY OF THE INVENTION

It is an object of the present invention to provide an auto-norming process & system for the norming of raw data.

It is also an important object of the invention to provide an auto-norming process & system for the norming of data on demand.

Another object of the invention is to provide an auto-norming process & system to provide an auto-normed percentile that is indicative of the level of a competency.

Still another object of the invention is to provide an auto-norming process & system for norming of data that includes a data base accessible by the Internet.

Still another important object of the invention is to provide an auto-norming process & system for norming of data that includes a data base and processing capability that are accessible by an Intranet (i.e., a local area network or LAN).

One further additional object of the invention is to provide an auto-norming process & system that recalculates a norm for a competency when data in the database changes.

One more additional important object of the invention is to provide an auto-norming process & system that relies upon an algebraic computation to approximate a normed score.

Still yet another object of the invention is to provide an auto-norming process & system that is available for use for the payment of a fee.

Yet another important object of the invention is to provide an auto-norming process & system that is cost-effective.

Still yet another important object of the invention is to provide an auto-norming process & system that is reliable.

Still yet one other important object of the invention is to provide an auto-norming process & system that is able to accommodate any number of people and any number of items (i.e., competencies) that are to be measured.

Still yet one other especially important object of the invention is to provide an auto-norming process & system that is able to vary the number of people and the number of items (i.e., competencies) that are to be measured.

Briefly, an auto-norming process & system that is constructed in accordance with the principles of the present invention has a database that includes a file for each person in a group. Each file includes a rating for each item of interest for that person. The files are updated as new data for each item becomes available. Processing capability is provided to calculate the norm for each competency (i.e., group of items) for each person. That norm is provided to authorized personnel as a percentile that is indicative of that person's competency for each item when compared with the competencies of other members in the group.

BRIEF DESCRIPTION OF THE DRAWINGS

FIG. 3 is a simple sample dataset of the raw "rating" scores for four people.

FIG. 4 is a table of intermediate computational values derived from the dataset of FIG. 3.

FIG. 5 is a table of the Z scores and the auto-normed percentiles of the four people of the dataset of FIG. 3.

FIG. 6 is a table of intermediate computational values, Z scores, and normed percentiles indicating the competencies of six people for four items measuring leadership ability.

DETAILED DESCRIPTION OF THE INVENTION

Figure 1:
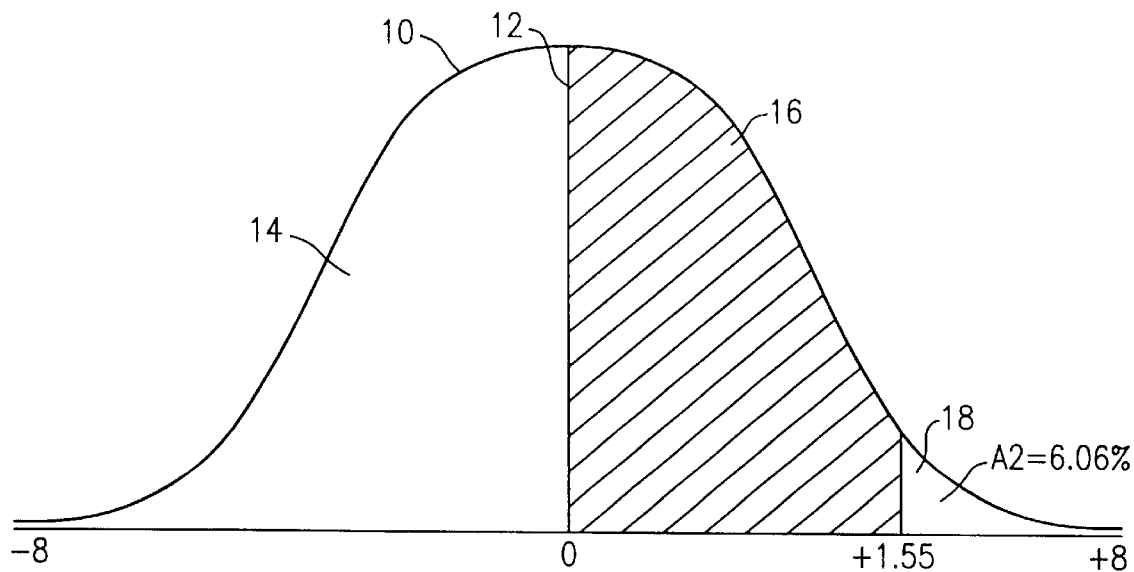
FIG. 1 is an example of a normal distribution curve and the probability of observing an outcome.

Referring to FIG. 1 is shown, a normal distribution curve 10. A mean 12 divides the curve 10 into two distribution halves. The mean 12 also corresponds to a Z score of 0.

A first area, identified by the reference numeral 14, to the left of the mean 12 reveals that its area (the integral of the area to the left of the mean 12 and under the curve 10) is 50% the total area.

Accordingly, the probability of an event, a score, a competency, falling under the first area 14 is 50%. This typically would represent the lower or poorer half of the scores.

A second area 16 to the right of the mean 12 and extending to a Z score of +1.55 includes 43.94% of the total area. The probability of an event falling between the mean and the right-most edge of area 16 is therefore 43.94%.

A Z score of +1.55 represents that point on the curve 10 that is 1.55 standard deviations above the mean.

The remaining area to the right of the Z score of +1.55 is a third area 18 and it includes 6.06% of the area under the curve 10. Accordingly, the probability of an event falling under the third area is 6.06%.

If a person (not shown) had a competency that fell in the third area 18, then that person's competency would be in the top 6% (approximately) when compared to his peers. The normal distribution (if enough measurement points are available for enough of his peers) would produce the normal distribution curve 10.

A raw score for this example would not provide a clue as to what this person's competency was when compared to his peers. Only after norming of the raw score was accomplished would we be able to determine that this particular competency was very high indeed.

The prior art method of norming data would include conducting a survey, a questionnaire to test the items of interest. These are normally behaviors that "other people" rate. For example, to determine leadership ability, one question might be to rate this person based on how well he gives feedback. Another question might be to rate him on how well he gives clear instructions. Other questions might rate him on other qualities deemed essential to a particular organization for leadership ability.

When compared to his peers, his normed score (a percentile) would indicate how he fared in each of these categories. Taken together, a very accurate and reliable measurement of his leadership ability, or lack thereof, as compared to his peers would emerge.

Let us assume, to carry the above example forward, that there are ten questions that address leadership and that each question may be rated from a "1" (poor) to a "5" (excellent). Therefore, the poorest score possible (if all ten questions are rated) would be a "10" and the highest score possible would be a "50".

Let us assume that this person gets a score of 38. Is that a good score? The raw data provides no clue. Let us assume that the mean score is 32 and the standard deviation calculates to be 2.5. Therefore, a score of 38 is over two standard deviations above the mean. Calculating the Z score and then doing a table lookup would reveal that this person scored in the top 1% (of the area under the normal curve 10) when compared to his peers.

It is clear that the raw score is meaningless. Only the normalized result has value in making legitimate comparisons of competency.

Figure 2:
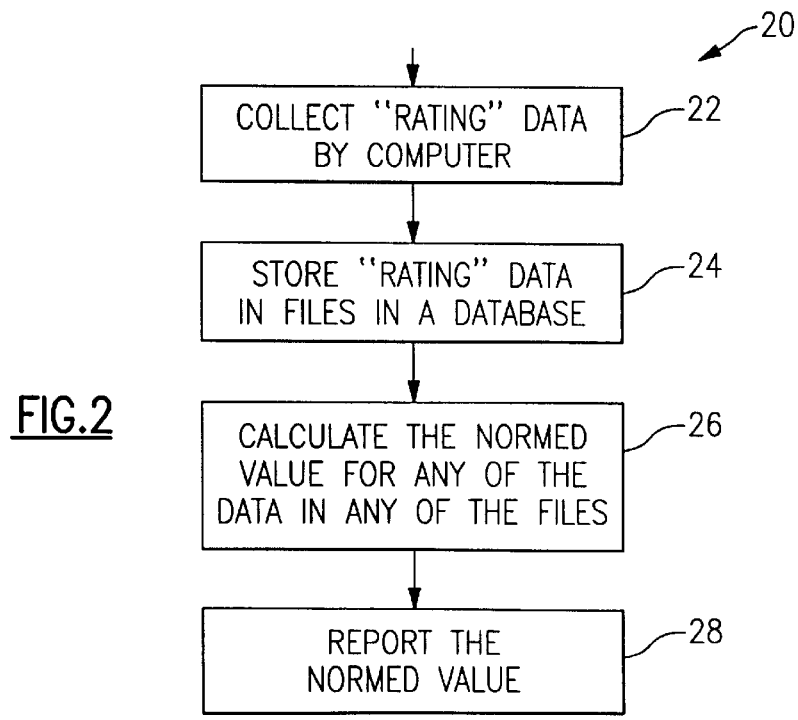
FIG. 2 is a flowchart of the basic steps of collecting and the norming of data utilizing a computer having access to a data base.

Referring now to FIG. 2, is shown a flowchart of the main steps of the auto-norming process and system, identified in general by the reference numeral 20.

The first step 22 is to collect the raw or rating data. This data is provided to a computer. A preferred system includes providing this data to the computer via the Internet.

This permits easy downloading of the data to the computer at any time from any location in the world. Of course, if desired, the Internet connection may be eliminated and the data may be collected in a more local area network, such as by a company "Intranet" connection, as is well known in the arts.

A second step 24 includes the storing of the raw or rating data in files in the database. The files will typically identify a person and the scores for every item that is being rated for that person. A separate record is provided for each person.

A third step 26 includes the computational steps necessary to calculate the normed value for any person for the items in the database.

This provides an indication of his competency for those items when compared to his peers and is provided as a percentile. This percentile means that this person, for these items, scored better than "x%" of his peers.

There are a number of ways that the auto-norming process and system 20 can accomplish the third step 26. For example, it is possible to use a Z score table (not shown) to look up a particular Z score. Continuing an earlier example, if a Z score of +1.55 was found in the Z score table it would reveal (as a result) a number of approximately "0.4394".

This number represents the area under the curve (created by the raw scores) that is to the right of the mean (because it is a positive "+" score). Adding the area to the left of the mean (0.5000) provides an intermediate value, namely 0.9394. Multiplying this value times 100 changes it into a percentile that is the normed value. This person, accordingly, has a normed value that reveals he or she scored in the top 93.94% when compared to his or her peers.

Therefore, it is possible for the auto-norming process and system 20 to include the Z score table, if desired, in a program subroutine and perform a lookup to determine the area under the curve to the right or left of the mean and accordingly use that area to determine the normed percentile, in the manner as was described hereinabove. However, when the size of the data base grows and the normed values for many persons are required, this slow the process and therefore is not optimum.

As mentioned hereinabove, it is desirable to expedite the process for the calculation of the normed values.

It is also possible for the auto-norming process and system 20 to perform the actual integral calculus necessary to determine the area under the curve. Again, this method can be slow and is not optimum.

An optimum way that provides a very accurate answer and which does so quickly relies upon algebraic approximation techniques, and is described in greater detail hereinafter.

A fourth step 28 is reporting the normed value to an authorized person.

Each of these main four steps 22–28 are described in greater detail hereinafter and by way of further example. The third step 26 is described below and shown in FIGS. 3–5. A skilled programmer can create software for the four steps 22–28.

Figure 9:
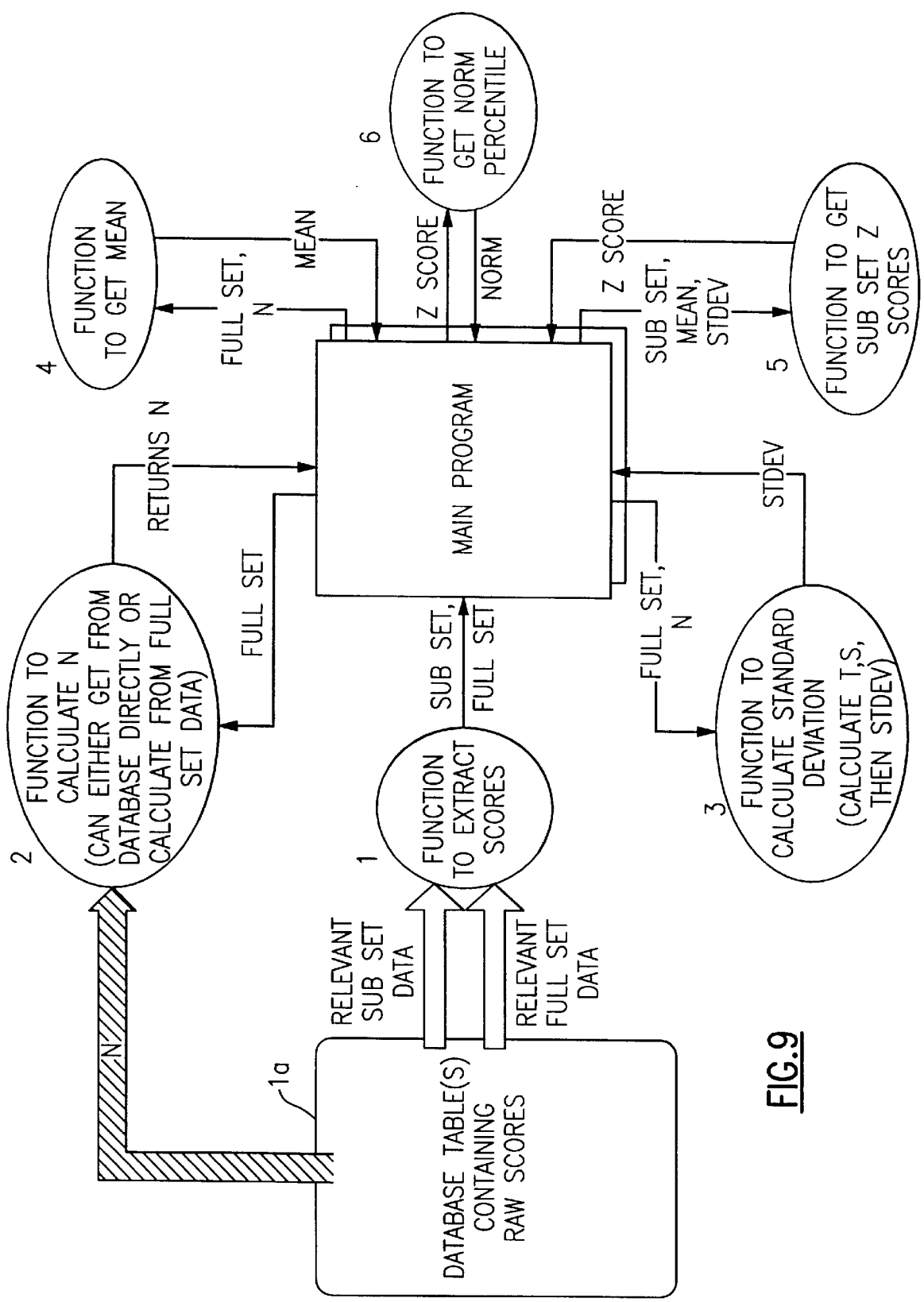
FIG. 9 is a more detailed flow chart of the third step of FIG. 2.

Referring now on occasion to FIGS. 3–5 and also on occasion to FIG. 9, a sample data set table of the raw rating scores for four people is shown in FIG. 3.

FIG. 9 is a flowchart of the third step 26 of FIG. 2. It shows the operations that are performed by the auto-norming process and system 20 on the raw rating scores, Raw Average Scores, and Raw Average Scores Squared of FIG. 3, the intermediate values of FIG. 4 that are used to obtain the Z scores and to determine the auto-normed percentiles of FIG. 5. There are, as discussed hereinabove, other ways to program the auto-norming process and system 20 so as to obtain the auto-normed percentiles. This is a preferred way.

The following detailed description of the third step 26 of FIG. 2 (as shown in the flowchart of FIG. 9) is preferred because it can be accomplished algebraically and therefore with minimized processing time and with minimum memory requirements. This is useful if the database contains a large number of raw rating scores or if access to the auto-norming process and system 20 is accomplished via a local area network or over the Internet.

Expanding upon the third step 26 of FIG. 2, the auto-norming process and system 20 first requires the acquisition of the ratings. A computer (not shown) collects this information and stores the rating information (i.e., the raw rating scores) for each item (items 1–6 of FIG. 3) in a database file for each person. The database files are stored in database tables 1a (FIG. 9). They contain the ratings (i.e., the raw scores) for each of four people as shown in FIG. 6.

The second step is to compute N, the number of people's scores. In this example N=4 because there are four people that have raw rating scores. The function to compute N is identified by a numeral "2" in FIG. 9.

It is to be understood that this is a small sample and is statistically insufficient to generate a normal distribution curve (identified by reference numeral 10, FIG. 1). It is included merely as an example to illustrate the necessary steps which are the same regardless of the size of the database.

The third step is to compute the RAW average score for each person. This is accomplished by summing all of the items for each competency for each person and dividing that person's summed score by the number of items reported (i.e., entered in the database) for that person. Although Fred and Paul are missing certain items, it is still possible to evaluate their competency based on the available information.

The function to compute each person's RAW average score occurs in function "1" in FIG. 9.

The fourth step is to compute S, the sum of all the RAW average scores. In this case S=10 (adding Joe's Raw average score of 3 to Fred's score of 3 to Sam's score of 2 to Paul's score of 2). The fourth step is included in function "3" of FIG. 9.

The fifth step is to compute T which is to square each of the RAW average scores and then to sum them together. I this case, T=26. The fifth step is also included in function "3" of FIG. 9.

The sixth step is to compute the MEAN which is the average of all of the S values. This step is included in function "4" of FIG. 9. In this case the MEAN is 2.5.

The seventh step is to compute the standard deviation (STDEV). In this case the STDEV is 0.5 and it represents the standard deviation of the distribution of all of the RAW average scores. The equation STDEV=SQRT((T−((S×S) IN))/N is used. As was mentioned hereinabove, the seventh step may be performed either after or before the mean is computed. According to FIG. 9, computing the STDEV is performed by function "3".

The eight step is to transform the RAW average score into a Z score by using the formula, Z score=(RAW average Score−MEAN)/STDEV. The Z score is performed by function "5" in FIG. 9.

The ninth step is to compute for each person's Z score, a first of several intermediate values. The first is R and is given by the equation R=1/SQRT(EXP(Z score×Z score)× 6.283185307. The ninth step through the fifteenth step are performed by function "6" of FIG. 9.

The tenth step is by using each person's Z score to compute W by the equation, W=1/((ABS(Z score)× 0.2316419)+1)

The eleventh step is to compute W2 which is to square each W value.

The twelfth step is by using each person's W and W2 scores, to compute P. P=(W×0.31938153)−(W2× 0.356563782)+(W×W2×1.781477937)−(W2×W2× 1.821255978)+(W2×W2×W×1.330274429).

The thirteenth step is by using each person's P and R scores, compute PLEFT=1−((2×P×R)/2).

The fourteenth step is conditional and is done only when the person's Z score is less than zero (negative). If the Z score is less than zero, then PLEFT=1−PLEFT.

The fifteenth step is to round the value of PLEFT to the closest whole percentage.

Obviously, the above example contains too few data points for too few individuals to generate a smooth curve (not shown) and a corresponding set of meaningful normed values upon which to evaluate performance. It is included merely as a simple example to show the process by which the system determines a normed value by algebraic techniques and the use of several intermediate values.

Referring now to FIG. 6, is shown a dataset of intermediate values and normed percentiles for four competency items of six employees. The raw data that was used to compute these intermediate values and the normed percentiles was excerpted from a much larger dataset (not shown) which contained the raw data (and intermediate values and normed percentiles) for many employees of an organization (i.e., a company, business, or firm, etc.).

The table as shown in FIG. 6 represents only a sampling of results that were included in the much larger dataset. These values (i.e., for these six employees) were selected to show the utility of normed values in determining various levels of competency.

The intermediate computational values of FIG. 6 are derived in the same manner as was described for the previous example and as is shown in FIGS. 3–5. Raw data (not shown) was processed as described hereinabove so as to provide the intermediate computational values (Raw Average Score, Z, R, W1, W2, P, PLEFT) and the ultimate value that is desired, the normed percentile.

The intermediate computations values are for each of four items that include a critical thinking ability 100, a communication skills ability 102, an overall leadership skills assessment 104, and a project management ability assessment 106.

These four items 100, 102, 104, 106 are a measure of the competency a person has, compared to his or her peers, in each of these areas. They reflect "other peoples' opinions" because typically it is other people who answer the various questions that determine the raw scores for each of these four items 100–106.

Those other people may be from that person's peer group (i.e., his coworkers) or they may include assessment of his behavior (i.e., his competency in each of these four items 100–106) by his superiors or even by his subordinates.

The individual competencies provide a measure of that person's competency for each of these items 100–106.

When viewed together, these individual competencies provide a very valid measure of that person's ability, of his or her competency, as it relates to a more abstract and general attribute, in this case the attribute of "leadership". Together, they provide a highly accurate and effective predictor of that person's overall competency as a leader (i.e., a manager).

By this, the normed percentile is intended to answer the question posed by the organization, "How good a leader or manager is this person when compared to his or her peers? If we promote this person, how effective will he or she be as a leader?"

Obviously, the organization seeks to recognize and to reward or to promote the most competent people it has to management (leadership) positions as opposed to rewarding or promoting those whose performance is below their peers or who are far less likely to make effective leaders/managers.

Who will make a competent manager? That has not been an easy question for any organization to answer. Rather, in the past organizations have required that those people in a position to decide make their best "educated guess". This makes the process of evaluating performance, compensating employees, and of promoting appear highly subjective and discriminatory.

Those not receiving maximum pay increases or promotions often feel unfairly treated or wrongly "passed over" for promotion. They may take legal recourse thereby forcing the organization to divert its energies and to somehow justify the subjective decisions it has made. Without objective data to support its decisions, in this legal arena the organization can and often does lose.

The use of norms, as is shown hereinafter for the dataset of FIG. 6, provides a most effective and objective way for the organization to make these types of determinations, a way that can even stand up to the rigors of legal scrutiny.

Referring again to FIG. 6, is believed by the organization that these four items 100–106, when considered together, provide an accurate measure for predicting [for that organization] the leadership or management ability or potential (i.e., ability) of their employees.

These four items 100–106 that are being measured and normed provide an "instrument" useful to the organization as it attempts to measure the vague and somewhat intangible attribute that is generally referred to as "leadership".

The organization will, over time, improve the "instrument" that it uses in measuring leadership ability, or for that matter, any other attribute. This improvement is accomplished by eliminating some of the questions (i.e., items) that are later deemed to be of lesser value. It is also accomplished by occasionally adding new questions that query the individual's competency for other items that the organization learns to be relevant to the overall competency that is being measured.

For any given competency that is being evaluated, the number and scope of the items that are being measured (i.e., that are used to create the "instrument") will vary. When the same competency if being measured for different organizations, for example leadership, the items that are considered may vary widely.

For example, with certain organizations that require more repetitive types of tasks to be performed by their managers (i.e., their leaders), the critical thinking ability 100 may not be deemed as important and so it may not appear on the particular "instrument" that that organization uses as it measures an employee's leadership competency.

Rather, they might include in lieu thereof another item, such as "dependability". This would be done if it was considered important for a leader to simply persist in doing the repetitive tasks that are required of him or her faithfully over time.

If both organizations require that their leaders convey information to others then both organizations will likely retain an item that measures the communication ability 102 of its employees.

For each of the four items 100–106, the intermediate computations values are shown for a first person 108, a second person 110, a third person 112, a fourth person 114, a fifth person 116, and a sixth person 118.

The intermediate values that appears under each item heading is the RAW Average score for that person for that item.

A first percentile, identified in general by the reference numeral 120, is the normed score for each person 108–118 for the critical thinking 100 item.

As the first percentiles 120 reveal, the first person 108, the fifth person 116, and the sixth person 118 have deficit scores, when compared to their peers, in this domain. By way of contrast, the third person 112 shows a remarkable superiority in this area.

Accordingly, the organization would provide all of its employees (108–118) with periodic feedback of their performance and, if appropriate, of the need to improve in this area. This type of feedback is documented.

Over time, new raw data for the critical thinking 100 item is again obtained and re-evaluated, as it is for all of the other items 102–106). Those people demonstrating improvement in the critical thinking 100 behaviors that they exhibit attest to the efficacy of the normed measurement process and the feedback that they have received as a result thereof.

Those people failing to make improvement over time may eventually need to be either removed from the organization or reassigned to another position (i.e., job) therein. The use over time of the normed data, in this example of the first percentile 120, provides the organization with far more objective data upon which to base its human resource decisions than could otherwise be obtained.

A second percentile, identified in general by the reference numeral 122, is the normed score for each person 108–118 for the communication skills 102 item.

A third percentile, identified in general by the reference numeral 124, is the normed score for each person 108–118 for the leadership skills assessment 104 item.

A fourth percentile, identified in general by the reference numeral 126, is the normed score for each person 108–118 for the project management ability assessment 106 item.

The third person 112 shows high ability in each of these areas. It is clear that this person is an effective leader, if he or she is so functioning in that capacity, or that this person is especially likely to become one if he or she is promoted into a leadership position that relies upon these four competency items 100–106.

The need to mentor and counsel the other people 108, 110, 114, 116, 118 for certain competencies is revealed as is the ability to acknowledge achievement for other competencies. For example, the sixth person 118 should rightly receive acknowledgment for his or her scores regarding the leadership skills 104 item.

Each of the first through sixth persons 108–118 will benefit from learning of their normed percentiles for each of the four items 100–106. If they properly utilize this information, the benefit will be substantial.

They will each have a better feel as to where their strengths and deficits are. They will each be in a better position to make career life-choices that more effectively utilize their strengths and rely less upon their deficit areas. Alternatively, they can seek help, such as tutoring, so as to overcome some of their deficit areas. In some instances, they may delegate some of the work that reflects areas in which they are somewhat deficit so that they can concentrate on being of service through areas in which they are strong.

The overall low performance of the first person 108 gives pause as to whether or not that person is suited for the position he or she now occupies. If the four items 100–106 are required competencies for that position, that person is functioning in a job position that relies upon areas that reflect his or her deficits, rather than his or her strengths.

Perhaps the first person 108 should be moved into another job position. Perhaps as mentioned hereinabove, if after counseling, he or she does not show substantial improvement over time he or she may, worst case, need to be dismissed from the organization.

Obviously, if the first person 108 is considering a change in position from a current job that does not require strength in these particular competencies to a new job that does, it is clear that the first person 108 has not yet mastered the skills to perform well in the new position.

If the organization is wishing to promote one of its employees into a leadership position, it is obvious that they should well consider doing so for the third person 112, who excels in all competencies for that job category. It is also important to note that while the RAW AVERAGE SCORES for the third person 112 are somewhat above those of his or her peers, they do not indicate just how stellar are that person's competencies.

For that level of insight to arise, one must first process the raw data so as to obtain the normed percentiles 120–126. It is the normed percentiles 120–126 that provide a mathematical comparison of any individual's performance (i.e., competency) in relation to that of their peers (i.e., other employees).

Figure 7:
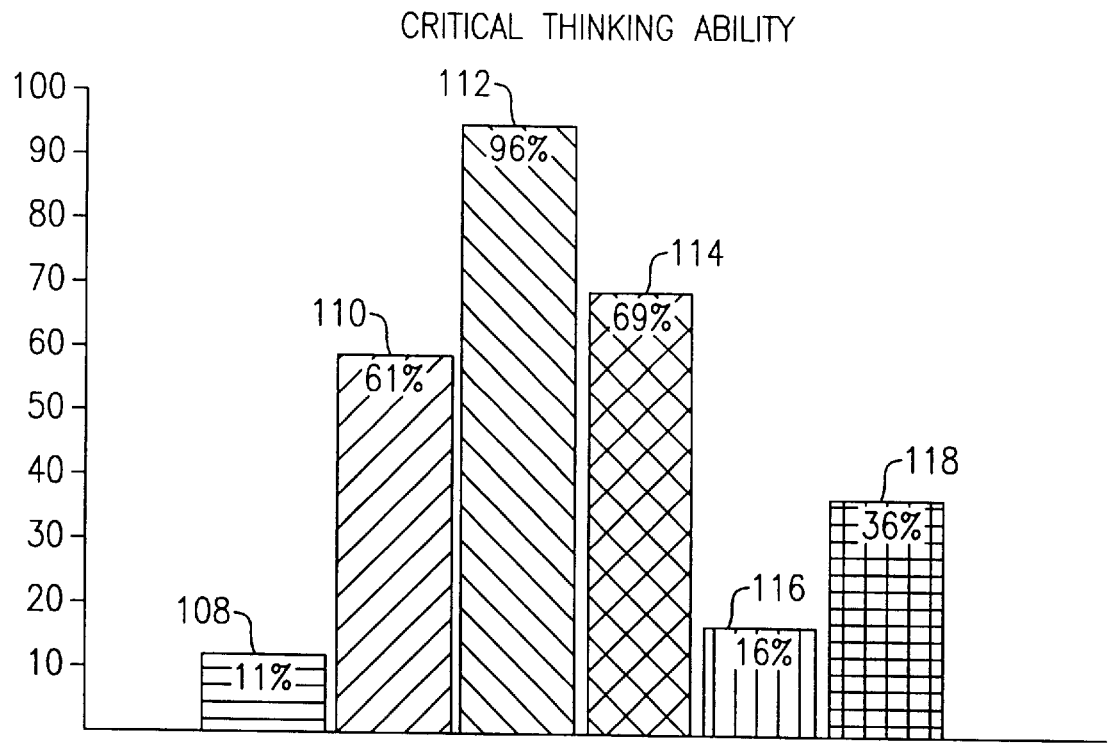
FIG. 7 is a bar graph representation of the auto-normed percentiles of FIG. 5.

If desired, the normed percentiles 120–126 may be expressed other than by the mere numeric representation of each value. For example, referring to FIG. 7, they may be expressed visually, such as by use of bar graphs for any of the first through sixth persons 108–118. The bar graphs of FIG. 7 reveal by a glance to each of the first through sixth persons 108–118 how their competency for critical thinking 100 compares with that of their peers.

The first and the fifth persons 108, 116 can see how deficit they are in this area of competency. The second and the fourth persons 110, 114 can see that they are somewhat above the median in their critical thinking competencies. The sixth person 118 can readily see how he needs some improvement and the third person 112 can see how well he or she is performing in this regard.

If desired, any other method to represent the normed percentiles 120–126, either individually or combined, may be used, such as by the use of a pie chart (not shown). The preferred way to express the normed percentiles 120–126 are best determined by those who will use them.

Obviously, if any other competency is to be measured a new instrument (i.e., a set of new questions) must be created or otherwise provided. These questions must address the various factors that contribute to, or are relevant to, that competency.

For example, if the vocation under consideration is a research chemist, leadership may not be an important item to measure. However, critical thinking ability may still be important as well as persistence, imagination, or other attributes.

Similarly, the proper instrument to measure fitness as a highway toll collector would likely be vastly different from that of the research chemist.

It is noted that the normed percentiles 120–126 are in fact "auto-normed" percentiles. This is because they are calculated on demand by the instant invention as is described in greater detail hereinafter.

Figure 8:
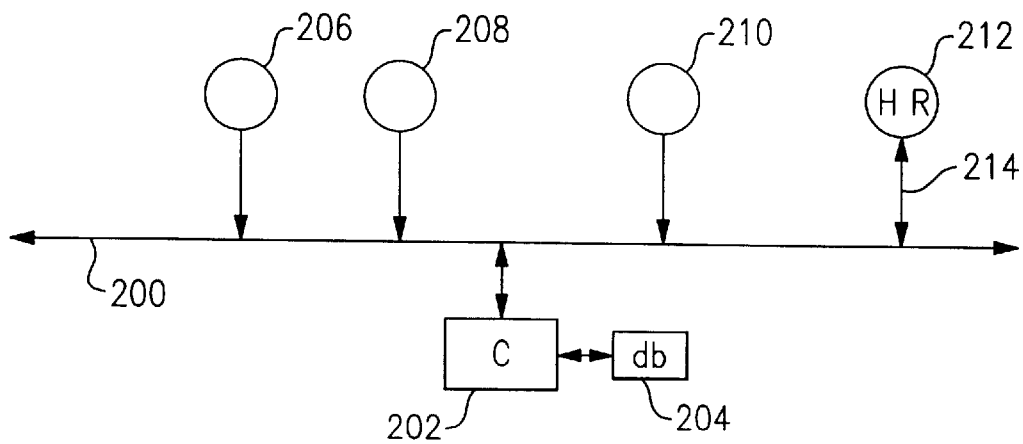
FIG. 8 is a block diagrammatic view of connections to an area network of the auto-norming system.

Referring now to FIG. 8, is shown a block diagrammatic view of connections to an area network 200 of the auto-norming system. The area network 200 is preferably either the Internet or a Local Area Network (LAN), sometimes also known as an "Intranet".

A computer 202 is a "server" that is electronically connected to the area network 200 so that is can readily communicate with other computers and peripheral devices (not shown) that are also connected thereto, as are well known in the arts.

The computer 202 includes access to a database 204 which it updates and maintains as it receives new information that is transmitted over the area network 200.

A first source 206 is providing raw data that relates to a competency for a particular person (not shown). For the purposes of illustration, assume that the first source 206 is a person in Idaho. The raw data is received by the computer 202 and stored in a first file in the database 204.

A second source 208 is also providing raw data. The raw data provided by the second source 208 may relate to the particular person as does the raw data received from the first source 206 or it may relate to a completely different person (not shown).

If it relates to the particular person it is also stored in the first file in the database 204. It may be added to existing data in the first file or it may replace older data. The exact way in which the database 204 is updated is at the discretion of the human resource personnel and it depends upon what it is that is being measured.

If for example, performance over a protracted period of time is being measured, then the database will likely have the new data summed together in the first file with any pre-existing data. If however, it is desired to track improvements after mentoring the particular person over the next three month interval, then the new data would, most likely, be used to replace recent data so as to obtain a more accurate indication of recent changes in behavior, rather than long-term average behaviors.

If the raw data provided by the second source 208 related to the different person, it would be stored by the computer 202 in a second file in the database 204.

Let us assume that the second source 208 is located in Texas.

Similarly, raw data is provided by a third source 210 that is located in the country of France in the European continent.

If the first through the third sources 206–210 are of a position that permits them to enter (i.e., input) raw data to the database 204, then it is assumed that they will have a password or a security clearance that allows them to do so. They may not be privileged to modify existing data in the database 204 nor to request the computer 202 (i.e., the auto-norming system) to calculate the auto-normed percentiles for any of the people having a file in the database 204. Such privileges are reserved for those having such authority, such as higher level managers or human resource personnel.

A fourth source 212 is a human resources manager. Let us assume the fourth source 212 is located in California. Let us assume that the corporate headquarters of the organization that is evaluating the performance of its "world-wide" employees is also located in California and that the fourth source 212 works at that location.

It is totally irrelevant and immaterial as to where the computer 202 and database 204 are located. They may be located anywhere in the world, providing the area network 200 is also there. Access to the computer 202 and the database 204 and to the processing capability thereof via the area network 200 is all that matters to any user of the auto-norming system.

It is also anticipated, as is a well known method to improve systems reliability in general, that there may in fact be a second computer (not shown) and a second database (not shown), most probably disposed geographically away from the computer 202 and from the database 204. The second computer and the second database would create a backup of all files and would also have the same processing abilities. The second computer and second database would be used when the computer 202 and the database 204 are being repaired, upgraded, or are otherwise inoperative.

The fourth source 212 is shown as having a two-way link 214 via the area network 200 to the computer 202 and the database 204. It is assumed that the fourth source 212, being a human resources expert, will be able to manipulate the data in the database 204 as desired. Again the fourth source 212 may wish to instruct the computer 202 to process the data over a long period of time or for any interval of interest.

The fourth source 212 will have security clearance (i.e., a password or level of authorization) that allows for such data manipulation. It will also allow the fourth source 212 to instruct the computer 202 to perform an auto-norming operation upon the data in the database 204 and to output the auto-normed percentiles (i.e., 120–126 from FIG. 6) or any of the raw data or intermediate computational values via the area network 200 back to the fourth source 212.

The fourth source 212 may use the auto-normed percentiles 120–126 to evaluate performance, establish appropriate feedback and counseling, etc. The fourth source 212 may elect to make this data available to any other person anywhere in the world. It may be appropriate, for example, to send the auto-normed percentiles 120–126 back to any or all of the first through the third sources 206–210.

As is well known in the programming arts, these computer-based data collection, storage, and reporting features may be coded in other languages and in other ways so as to accomplish the same functions as a result of benefiting from the disclosure herein.

The invention has been shown, described, and illustrated in substantial detail with reference to the presently preferred embodiment. It will be understood by those skilled in this art.that other and further changes and modifications may be made without departing from the spirit and scope of the invention which is defined by the claims appended hereto.

What is claimed is:

1. An auto-norming system, comprising:
   (a) a database that is accessible by connection to an area network;
   (b) means for calculating a normed value for a file in said database;
   (c) wherein said database includes a file for every person in a group;
   (d) and wherein said file includes raw data;
   (e) and wherein said software includes algorithm means for algebraically calculating said normed value;
   (f) and wherein said algorithm means includes software that is adapted to perform the additional steps of:
      (a) computing the value of "N", wherein N includes the number of people having said file of raw data for said group;
      (b) computing the RAW AVERAGE SCORE for each of said people;
      (c) computing the value of "S", wherein S includes the sum of all the RAW AVERAGE SCORES
      (d) computing the value of "T" which includes the step of squaring each of the RAW AVERAGE SCORES to produce a SQUARE value and the step of summing each of said SQUARE values;
      (e) computing the MEAN;
      (f) computing the STANDARD DEVIATION;
      (g) transforming said RAW AVERAGE SCORE into a Z SCORE, wherein the step of transforming includes the step of subtracting said MEAN from said RAW AVERAGE SCORE and the subsequent step of dividing the result thereof by said STANDARD DEVIATION;
      (h) computing an intermediate value of "R" and by use of the equation R=1/SQUARE ROOT(EXP(Z SCORE×Z SCORE)×6.283185307;
      (i) computing an intermediate value of "W" by use of the equation, W=1/((ABSOLUTE VALUE(Z SCORE)×0.2316419)+1);
      (j) computing an intermediate value of "W2" by squaring each W value;
      (k) computing an intermediate value of "P" by use of the equation, P=(W×0.31938153)−(W2× 0.356563782)+(W×W2×1.781477937)−(W2×W2× 1.821255978)+(W2×W2×W×1.330274429);
      (l) computing an intermediate value of "PLEFT" by use of the equation, PLEFT=1−((2×P×R)/2); and
      (m) applying the equation, PLEFT=1−PLEFT conditionally only when the Z SCORE is less than zero.

2. The auto-norming system of claim 1 including a computer that is accessible by connection to said area network.

3. The auto-norming system of claim 2 wherein said computer includes means for accessing said database.

4. The auto-norming system of claim 1 wherein said area network includes an Internet.

5. The auto-norming system of claim 1 wherein said means for calculating includes software.

6. The auto-norming system of claim 5 wherein said software is used to control the functioning of said computer.

7. The auto-norming system of claim 1 wherein said means for calculating includes algebraic means for calculating said normed value.

8. The auto-norming system of claim 1 wherein said normed value includes a percentile.

9. The auto-norming system of claim 8 wherein said percentile indicates a competency of a person in said group when compared with that of other people in the said group.

10. The auto-norming system of claim 8 wherein said percentile is statistically accurate.

11. The auto-norming system of claim 1 wherein said area network includes a local area network.

12. The auto-norming system of claim 11 wherein said local area network includes an Intranet.

13. A process for auto-norming, consisting of the steps:
 (a) providing a database that is accessible by a connection to an area network;
 (b) calculating a normed value for a file in said database;
 and wherein said step of providing said database includes the step of collecting raw data for at least one person from a group and storing said raw data in said database;
 and wherein the step of providing said database includes the step of providing a file in said database of said raw data for every person in said group;
 and wherein the step of calculating said normed value includes the step of performing at least one algebraic operation upon said raw data value prior to the step of calculating said normed value;
 and wherein said at least one algebraic operation includes the additional steps of:
  (a) computing the value of "N", wherein N includes the number of people having said file of raw data for said group;
  (b) computing the RAW AVERAGE SCORE for each of said people;
  (c) computing the value of "S", wherein S includes the sum of all the RAW AVERAGE SCORES
  (d) computing the value of "T" which includes the step of squaring each of the RAW AVERAGE SCORES to produce a SQUARE value and the step of summing each of said SQUARE values;
  (e) computing the MEAN;
  (f) computing the STANDARD DEVIATION;
  (g) transforming said RAW AVERAGE SCORE into a Z SCORE, wherein:the step of transforming includes the step of subtracting said MEAN from said RAW AVERAGE SCORE and the subsequent step of dividing the result thereof by said STANDARD DEVIATION;
  (h) computing an intermediate value of "R" and by use of the equation R=1/SQUARE ROOT(EXP(Z SCORE×Z SCORE)×6.283185307;
  (i) computing an intermediate value of "W" by use of the equation, W=1/((ABSOLUTE VALUE(Z SCORE)×0.2316419)+1);
  (j) computing an intermediate value of "W2" by squaring each W value;
  (k) computing an intermediate value of "P" by use of the equation, P=(W×0.31938153)−(W2× 0.356563782)+(W×W2×1.781477937)−(W2× W2×1.821255978)+(W2×W2×W×1.330274429);
  (l) computing an intermediate value of "PLEFT" by use of the equation, PLEFT=1−((2×P×R)/2); and
  (m) applying the equation, PLEFT=1−PLEFT conditionally only when the Z SCORE is less than zero.

14. The process of claim 13 wherein the step of providing said database includes providing a computer that is accessible by connection to said area network and wherein said computer is disposed intermediate with respect to said database.

15. The process of claim 13 wherein the step of calculating said normed value for a file in said database includes the step of providing a percentile that is indicative of the level of competency of said person when compared to that of said every person in said group.

16. The process of claim 13 wherein said step of performing at least one algebraic operation includes the step of creating at least one intermediate value prior to the step of calculating said normed value.

17. The process of claim 13 including the step of rounding the value of PLEFT to the closest whole percentage.

18. The process of claim 13 wherein the step of providing a database that is accessible by a connection to an area network includes the step providing a database that is accessible by connection to an Internet.

19. A process for auto-norming, consisting of the steps:
 (a) providing a database that is accessible by a connection to an area network;
 (b) calculating a normed value for a file in said database;
 (c) wherein said step of providing said database includes the step of collecting raw data for at least one person from a group and storing said raw data in said database;
 (d) wherein the step of providing said database includes the step of providing a file in said database of said raw data for every person in said group;
 (e) wherein the step of calculating said normed value for a file in said database includes the step of providing a percentile that is indicative of the level of competency of said person when compared to that of said every person in said group;
 (f) wherein the step of calculating said normed value includes the step of performing at least one algebraic operation upon said raw data value prior to the step of calculating said normed value;
 (g) wherein said step of performing at least one algebraic operation includes the step of creating at least one intermediate value prior to the step of calculating said normed value; and
 (h) including the additional steps of:
  (a) computing the value of "N", wherein N includes the number of people having said file of raw data for said group;
  (b) computing the RAW AVERAGE SCORE for each of said people;
  (c) computing the value of "S", wherein S includes the sum of all the RAW AVERAGE SCORES
  (d) computing the value of "T" which includes the step of squaring each of the RAW AVERAGE SCORES to produce a SQUARE value and the step of summing each of said SQUARE values;
  (e) computing the MEAN;
  (f) computing the STANDARD DEVIATION;
  (g) transforming said RAW AVERAGE SCORE into a Z SCORE, wherein the step of transforming includes the step of subtracting said MEAN from said RAW AVERAGE SCORE and the subsequent step of dividing the result thereof by said STANDARD DEVIATION;
  (h) computing an intermediate value of "R" and by use of the equation R=1/SQUARE ROOT(EXP(Z SCORE×Z SCORE)×6.283185307;
  (i) computing an intermediate value of "W" by use of the equation, W=1/((ABSOLUTE VALUE(Z SCORE)×0.2316419)+1);
  (j) computing an intermediate value of "W2" by squaring each W value;
  (k) computing an intermediate value of "P" by use of the equation P=(W×0.31938153)−(W2×

0.356563782)+(W×W2×1.781477937)−(W2×W2×1.821255978)+(W2×W2×W×1.330274429);

(l) computing an intermediate value of "PLEFT" by use of the equation, PLEFT=1−((2×P×R)/2); and (m) applying the equation, PLEFT=1−PLEFT conditionally only when the Z SCORE is less than zero.

* * * * *